United States Patent [19]
Stoll et al.

[11] Patent Number: 5,190,078
[45] Date of Patent: Mar. 2, 1993

[54] SEALING DEVICE FOR A MULTIWAY VALVE AND A METHOD FOR THE PRODUCTION THEREOF

[75] Inventors: Kurt Stoll, Esslingen; Siegfried Kettner, Korntal-Münchingen, both of Fed. Rep. of Germany

[73] Assignee: Festo KG, Esslingen, German Democratic Rep.

[21] Appl. No.: 802,057

[22] Filed: Dec. 3, 1991

[30] Foreign Application Priority Data

Jan. 16, 1991 [DE] Fed. Rep. of Germany ....... 4101059

[51] Int. Cl.⁵ ............................................. F15B 13/04
[52] U.S. Cl. .................. 137/625.69; 251/900; 277/37; 277/58; 277/206 R
[58] Field of Search ............... 137/625.69; 251/900; 277/35, 37, 58, 206 R

[56] References Cited

U.S. PATENT DOCUMENTS

| | | |
|---|---|---|
| 2,717,793 | 9/1955 | Nenzell . |
| 2,892,644 | 6/1959 | Collins ............................ 277/206 X |
| 3,028,165 | 4/1962 | Collins ............................ 277/206 |
| 3,103,231 | 9/1963 | Moen ......................... 137/625.17 X |
| 3,170,488 | 2/1965 | Manoogian ................... 137/625.17 |
| 3,199,540 | 8/1965 | Forster .......................... 137/625.69 |
| 3,418,022 | 12/1968 | Hennells ....................... 277/206 X |
| 3,422,852 | 1/1969 | Ney ............................... 137/625.69 |
| 3,565,115 | 2/1971 | Beckett et al. ................ 137/625.69 |
| 3,968,971 | 7/1976 | Mariaulle .................. 137/625.69 X |
| 4,491,155 | 1/1985 | Meyer et al. ..................... 251/324 X |
| 4,522,374 | 6/1985 | Neff .................................. 251/900 X |
| 4,630,800 | 12/1986 | Brausfeld et al. ........... 137/625.69 X |

FOREIGN PATENT DOCUMENTS

| | | |
|---|---|---|
| 0103564 | 9/1983 | European Pat. Off. ........ 137/625.69 |
| 2062292 | 6/1971 | Fed. Rep. of Germany ................. 137/625.69 |
| 3022598 | 1/1981 | Fed. Rep. of Germany . |
| 3240827 | 5/1984 | Fed. Rep. of Germany ................. 137/625.69 |
| 1384671 | 2/1975 | United Kingdom ........... 137/625.69 |

Primary Examiner—Gerald A. Michalsky
Attorney, Agent, or Firm—Flynn, Thiel, Boutell & Tanis

[57] ABSTRACT

A sealing device which is more particularly designed for pneumatic multiway valves. The device comprises a holding sleeve, which both at its outer periphery and also at its inner periphery has a plurality of axially spaced circumferentially extending holding recesses, wherein sealing elements are held and at least the inner sealing elements are constituted by sealing material injected into the associated holding recesses directly. Furthermore the invention provides a method for the simple possible of the such a sealing device.

21 Claims, 2 Drawing Sheets

SEALING DEVICE FOR A MULTIWAY VALVE AND A METHOD FOR THE PRODUCTION THEREOF

FIELD OF THE INVENTION

The invention relates to a sealing device for pneumatic multiway valve, which device is adapted to be arranged within the cavity of the valve housing where it may function to receive a piston-like valve spool and, more particularly, to a sleeve-like holding structure for annular sealing elements which, both adjacent to the outer periphery and also adjacent to the inner periphery, has a plurality of axially spaced circumferentially extending holding recesses, in which the sealing elements are held. The invention also relates to a method for the manufacture of such a sealing device.

BACKGROUND OF THE INVENTION

A multiway valve fitted with such a sealing device is described in the U.S. Pat. No. 3,565,115. The multiway valve has housing, which has a substantially cylindrical recess, into which the valve ducts open laterally. The sealing device is arranged in the recess of the housing, such sealing device for its part receiving a piston-like valve spool. Between the sealing device and the valve housing annular sealing elements take effect in order to prevent undersired transfer of fluid between the valve ducts in the housing recess. Adjacent to the inner periphery of the sealing device sealing corresponding sealing elements are also located, which sealingly cooperate with the valve spool, which itself is without any seal. Owing to the change in the axial position of the valve spool it is possible in a conventional way to permit or interrupt a fluid power connection between the individual valve ducts.

The known sealing device consists of a multiplicity of components so that both the production and also the assembly within the housing recess is very complex. It is necessary for a large number of cage-like spacer elements to be placed in a row one behind the other to constitute a sleeve-like holding structure with groove-like holding recesses to receive individual sealing rings. The multipart design by and large leads to an assembly of the sealing rings without damage. In order to securely anchor the sealing rings cooperating with the valve spool the same have to be provided with a special anchoring section, for which reason the associated retaining recesses have a form of cross section which is not simple to produce. All in all, the axially aligned arrangement of the inner sealing elements in the valve housing leads to considerable problems.

SHORT SUMMARY OF THE PRESENT INVENTION

Accordingly one object of the present invention is to provide a sealing device of the type initially mentioned which while being simple to produce and readily assembled may be precisely arranged in the housing recess of a valve housing and which both has reduced manufacturing costs and ensures an improved seat, more particularly of the inner sealing elements, in the associated holding recesses. Furthermore, the invention seeks to provide a method for the advantageous production of the these sealing devices.

In order to attain such and other objects appearing herein the holding structure is designed in the form of a more particularly integral holding sleeve having the holding recesses and at least the inner sealing elements are constituted by sealing material directly molded in the associated holding recesses, each inner holding recess communicating with at least one passage for molding material leading to the outer periphery of the holding sleeve.

The sealing elements preferably formed by injection molding into their associated holding recesses, are characterized by an adhesive connection with the holding sleeve and consequently by an excellent seat. Pulling out of the sealing elements and possible damage by the passage of a sealing edge of the valve spool is practically out of the question during operation. Furthermore it is not necessary to design the holding structure in a plurality of parts for the purpose of assembly of the sealing elements, for which reason the holding structure is preferably in an integral form. This holding sleeve is, when fitted with the sealing elements, very simple to place in a recess of the housing and a high degree of accuracy as regards axial alignment of the sealing parts of the sealing elements is ensured. The sealing device practically constitutes a sealing cartridge together with the sealing elements able to be handled as a single component, which when necessary may be rapidly replaced. As a sealing material for the injected sealing elements it is more particularly preferred to use an elastomer such as a polyurethane, while the holding sleeve is manufactured of a harder synthetic resin or more particularly of a metal such as injection cast zinc alloy.

While the outer annular sealing elements, that is to say those associated with the outer periphery of the holding sleeve, are only statically loaded during the operation of a valve, in their case and in the case of the inner sealing elements it is a question of seals, which are injection molded or cast in the associated holding recesses.

In the case of a preferred embodiment of the invention there is the provision that at least one inner holding recess and at least one outer holding recess of the holding sleeve communicate with each other via at least one connecting duct formed in the holding sleeve. Since normally inner and outer holding recesses are each present in a plurality of pairs, it is preferred to have a corresponding duct connection for each pair of recesses. This means that it is possible to supply the sealing material via the ducts for molding material into the respective inner holding recess during molding of the sealing elements, whence the injected material is able to flow into the respective outer holding recess via the connection ducts. Apart from the fact that the connection ducts in this case have a venting function, they render possible an integral connection between the respectively associated inner and outer sealing elements. This means that there is an additional mechanical anchoring of the sealing elements in the holding recesses.

It is an advantage also if a free deformation space is provided associated with the molded sealing elements adjacent to their radially outwardly directed back, such free space extending at least some distance along the back, that is to say in the circumferential direction of the sealing elements in relation to the longitudinal axis of the back. This means that it is possible for the sealing part, which is for instance made with sealing lips, of the sealing elements to move out of the way radially, when during molding a mold core arranged in the holding sleeve is removed. The free space for deformation allows for the desired deformation so that the sealing parts are not damaged and the use of so-called drop cores, which is are disadvantageous because of the formation of flash, is not necessary.

For the production of the sealing device a method is suggested in the case of which at least the inner sealing elements are produced by injection molding or the like in the associated holding recess. Preferably the first step is to make a holding sleeve provided with the holding recesses for the annular sealing elements and with the duct for molding material, whereafter a holding sleeve is arranged in a mold, a more particularly integral mold core, which preferably is free of joints or gaps on the periphery, is positioned in the inner space of the holding sleeve, such core having adjacent to the sealing elements to be produced a configuration corresponding to the outline of the sealing part thereof in order to then to supply material in a moldable condition to the inner holding recesses, which are covered over radially inwards by the mold core, via the ducts for molding material.

BRIEF DESCRIPTION OF THE DRAWINGS

The sealing device in accordance with the invention and an advantageous method of producing it will now be described in the following with reference to one embodiment illustrated in the accompanying figures, in which.

DESCRIPTION OF THE PREFERRED EMBODIMENT OF THE INVENTION

Figure 1:
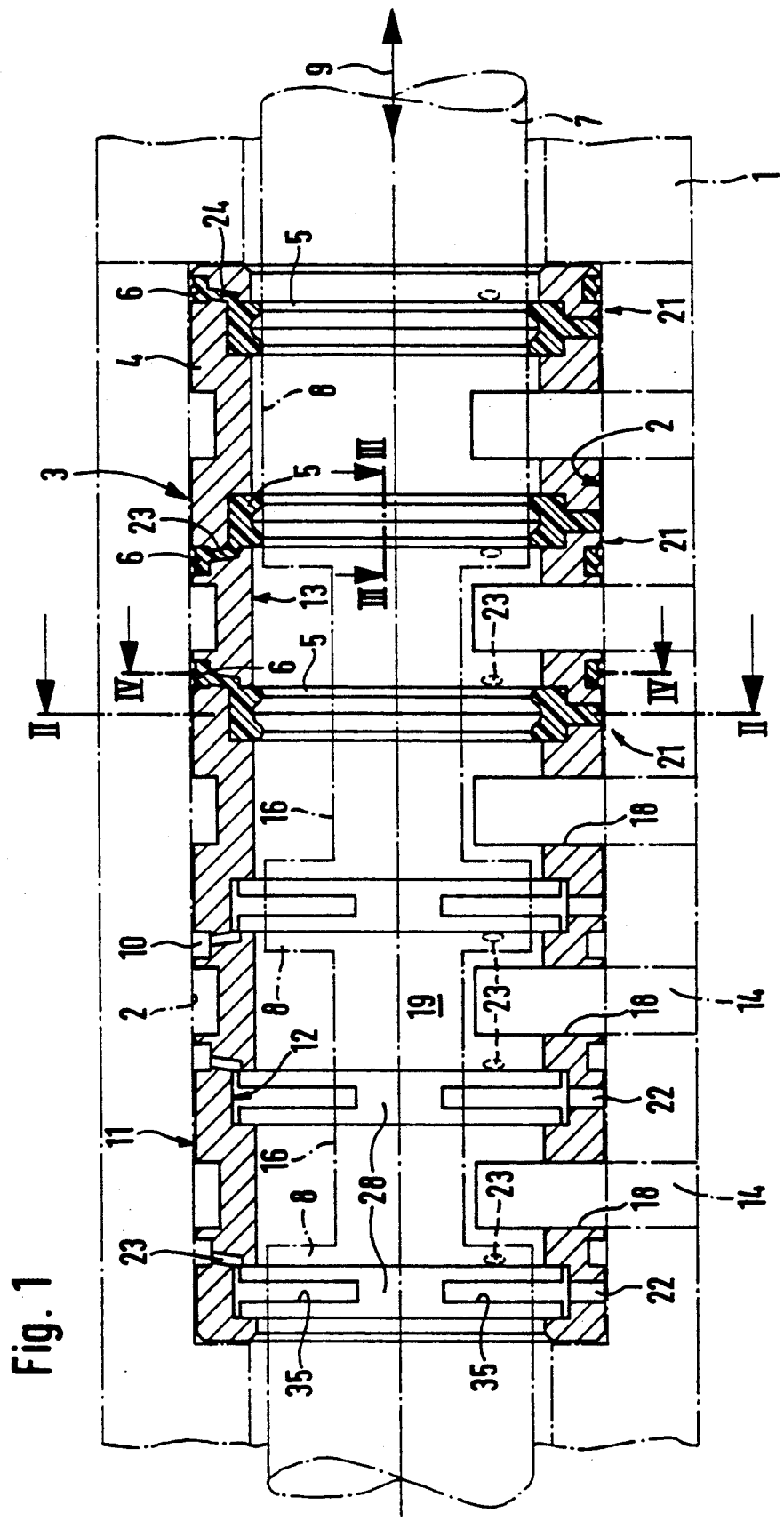
FIG. 1 shows a first form of the sealing device in a longitudinal section taken on the line I—I of FIG. 2, in which for the sake of clarity the sealing elements located in the holding recesses are only illustrated on the right hand side of the figure and the valve housing and the valve spool are only shown diagrammatically and in broken lines.

FIG. 1 shows a valve housing 1 of a pneumatic multiway valve in broken lines. Internally it possesses a housing space 2 with a substantially circular configuration, into which axially spaced out valve ducts 14 open which are circumferentially distributed. In the interior a sealing device 3 is fitted with an appropriate fit which consists essentially of a holding sleeve 4 on which inner (5) and outer (6) annular sealing elements are arranged. A coaxially arranged valve spool 7 like a piston is included within the holding sleeve 4 as shown in broken lines, such piston being for instance a round piston or a piston spool. It has a plurality of axially spaced guide sections 8 by means of which it is guided for axial reciprocation movement on the sealing device 3 as indicated by the twin arrows 9 and between which a transfer part 16 with a reduced spool diameter is to be found. Spool sections at the end of the axis may be used as pilot pistons for actuation.

The outer sealing elements 6 are located in circumferentially extending holding recesses 10 in coaxial alignment with the holding sleeve 4, such recesses 10 being provided adjacent to the outer periphery 11 in the holding sleeve 4. The circumferentially extending holding recesses 10 are machined adjacent to the outer periphery 11 in the holding sleeve 4. In a simple manner the inner sealing elements 5 are arranged in circumferentially extending inner holding recesses 12 machined in the inner periphery 13. The latter as well extend coaxially to the holding sleeve 4.

If as in FIG. 1 the sealing device 3 is in the condition ready for operation as part of a valve, then the external sealing elements 6 operate with a static sealing action in cooperation with the inner surface of the housing recess 2. In the case of the inner sealing elements 5 on the other hand it is a question of dynamic seals, capable of sealing cooperation with the outer surface of the guide sections 8. In a conventional manner during sliding movement of the valve spool 7 individual sealing elements alternately cooperate with the guide sections 8 in direct contact therewith.

In those axial parts which in the assembled condition are associated with a valve duct 14 the holding sleeve 4 is provided with a radial passage 18. It may extend like a slit some distance along the sleeve periphery. It allows fluid under pressure to flow between the inner space 19 of the holding sleeve 4 and the individual valve ducts 14.

In each case there is a plurality of inner and outer sealing elements 5 and 6 spaced out in the axial direction 9. In this respect preferably one inner and one outer sealing element 5 and 6 is associated with each other as a pair of sealing elements 21. One respective pair is located in the axial part between two adjacent passages 18, the outermost passages 18 being additionally flanked externally by one such pair 21.

As a result, the outer sealing elements 6 prevent axial fluid leakage in the part between the holding sleeve 4 and the valve housing 1 so that a sealing separation of the adjacent valve duct 14 is ensured. The fluid may respectively pass between axially adjacent valve ducts 14 and passages 18, if they have an associated transfer flow section 16. Simultaneously in this case the guide sections 8, which flank the transfer flow section 16, cooperate sealingly with a respective one of the sealing elements 5. It is in this manner that the multiway valve equipped with the sealing device 3 may control fluid flows.

As mentioned, each holding sleeve 4 has a plurality of holding recesses 10 and 12 both for the inner and also for the outer sealing elements 5 and 6. While it would be possible to provide a plurality of such holding sleeves for each multiway valve in an axial sequence, the single-piece configuration selected in the illustrated working embodiment is more particularly advantageous since it means that the sealing device has the form of an easily handled and simply replaced sealing cartridge. Furthermore as a result there are exactly matching dimensions and an arrangement of inner sealing elements 5, which are in exact axial alignment so that there is cooperation with the valve spool to produce and excellent sealing action.

At least the inner sealing elements 5 are constituted by sealing material injection molded into the holding recesses 12, that is to say the sealing elements are molded in this respect by injection molding or the like directly on the holding sleeve 4. As a sealing material it is convenient to use an elastomer with rubber-elastic properties. Since a sort of adhesive joint is produced with the holding sleeve 4 consisting of, for instance, a harder synthetic resin material or a metal such as die cast zinc alloy, the injected sealing elements are very securely anchored and are prevented from being pulled out of their sockets during operation while however being able to be simply and easily manufactured. Each inner holding recess 12 communicates in this case preferably with at least one duct for molding material 22 opening towards the outer periphery 11 of the holding sleeve 4 and through which the sealing material utilized for the injection molding may be fed while avoiding flash on the sealing part.

Since the outer sealing elements 6 are essentially only statically loaded, they may in principle be constituted by separate sealing rings which are later snapped into place. Owing to the improved dimensional stability and simpler manner of production they are however directly injected in place in a suitable manner into the associated holding recesses 10.

Figure 4:
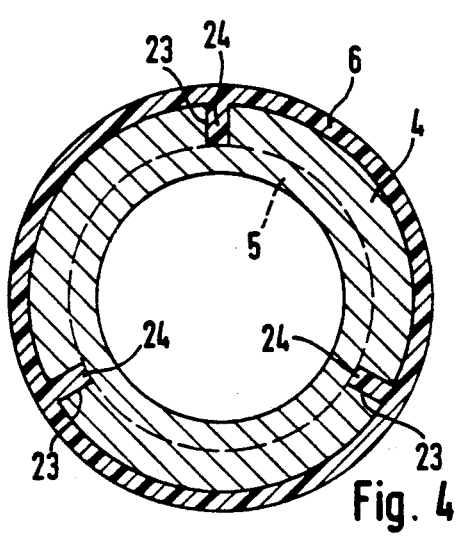
FIG. 4 shows a cross section taken through the sealing device of FIG. 1 on the section line IV—IV in order to indicate the connection duct extending between an inner and an outer holding recess.

In order to render it possible for the two sealing elements 5 and 6 to be produced as part of a single pair 21 of sealing elements as will be explained later in an injection operation, in the illustrated working embodiment there is the provision that the mutually associated holding recesses 10 and 12 communicate via at least one connecting duct formed in the holding sleeve. Preferably several such connection ducts 23 are provided per pair 21 of sealing elements, which are then best arranged with an equal spacing along the periphery of the sleeve. In the illustrated working embodiment of the invention, see FIG. 4, there are three such connection ducts 23 with an angular offset of 120°. Individually they are directed radially, and it will be seen from FIG. 1 that they may enter on the side of the outer holding recesses 10 adjacent to the floor of the recess and on the side of the inner holding recess 12 adjacent to one side of the recess. This is an advantage for large scale production and it is also an advantage if the mutually communicating holding recesses 10 and 12 are offset at least slightly in the axial direction 9.

In the injected state of the sealing material the connection ducts 23 are also filled up, the filling constituting a rib or bridge of material by means of which the mutually associated sealing elements are connected with each other integrally. This also leads to a useful effect as regards the strength of the seal seat, because the sealing element 5 and 6 connected with each other are additionally mechanically joined and made stronger. With reference to a respective inner sealing element 5 the associated ribs in the connection ducts 23 and the associated outer sealing element 6 practically constitute an interlockingly anchored securing part.

On its radially outwardly directed back side 25 (see FIGS. 2 and 3) each of the molded inner sealing elements 5 has at least one free space 30 for deformation which extend along at least part of the back side 25 and thus in the circumferential direction 26 in relation to the longitudinal axis 9. This free space 30 in the illustrated working embodiment is formed with a groove-like recess 31, which is machined from the rear side 25 into the respective sealing element 5. The seal elements 5 of the embodiment of the invention each have four such deformation recesses 31, which are distributed in the circumferential direction along the outer periphery or, respectively, back side 25. The deformation recesses 31 following each other in the circumferential direction 26 are consequently separated from each other by ribs 32 or bridges of sealing material.

The deformation recesses 31 are preferably located in each case between two axial edge parts 33 of the associated sealing element 5, via which the sealing element 5 is able to be supported on the floor of the associated holding recess 12 in the radial direction.

While it would in principle be possible to provide one annular, and closed coaxial deformation recess 31 for each inner sealing element 5, available production techniques call for the above described multiple arrangement, in which case it would also be possible to select a different number of deformation recesses, as for instance two thereof.

The deformation spaces 30 make possible an at least partly reversible and radially outwardly directed deformation, when a respective thrust is exerted on the sealing part 34, which is associated with the inner periphery of the seal elements 5. This is significant in conjunction with the production of the inner sealing elements for the trouble-free removal of a mold core.

At the rear side 25 each of the deformation spaces 30 present is provided with a recess 35 on the sleeve side, which preferably extends through the holding sleeve 4 radially. These recesses 35, which are preferably in the form of slits and each have an arc length corresponding to the length of the corresponding deformation recess 31, open radially at the inner end at the floor of a respective inner holding recess 12, where they are preferably in alignment with a deformation recess 31 facing same. At the other end, the recesses 35 are open towards the outer periphery 11.

During molding of the inner sealing elements 5, the recesses 35 serve to receive mold parts 36 applied from the outside and which have end sections 37, corresponding to the outline of the deformation recess 31, which is to be produced, extending into the holding recess 12. The end sections 37 mean that during molding of the sealing elements the respective deformation recess 31 is created.

Further details of the sealing device will be gathered from the following description of a preferred method of manufacture designed for producing it.

For the production of the above described sealing device 3 the first step is to take or manufacture a holding sleeve 4, which is provided with the inner and outer holding recesses 10 and 12, with ducts for molding material 22 and with the connection ducts 23 in the described manner. Furthermore the holding sleeve 4 in this stage preferably has the finished configuration and accordingly for instance also has the passages 18.

Furthermore for each inner holding recess 12 the holding sleeve 4 has a plurality of slit-like recesses 35, in the present case 4 thereof, which each extend some distance in the circumferential direction 26 of the holding sleeve 4 and extend radially through the wall of the sleeve. The width of the slit is somewhat less than the width of the holding recesses 12 adjacent to the floor of the groove, as is well shown in FIG. 3. Recesses 35 which are opposite to each other in the circumferential direction 26 are separated from each other by ribs 28 of material of the holding sleeve 4 (see FIGS. 1 and 2).

Figure 2:
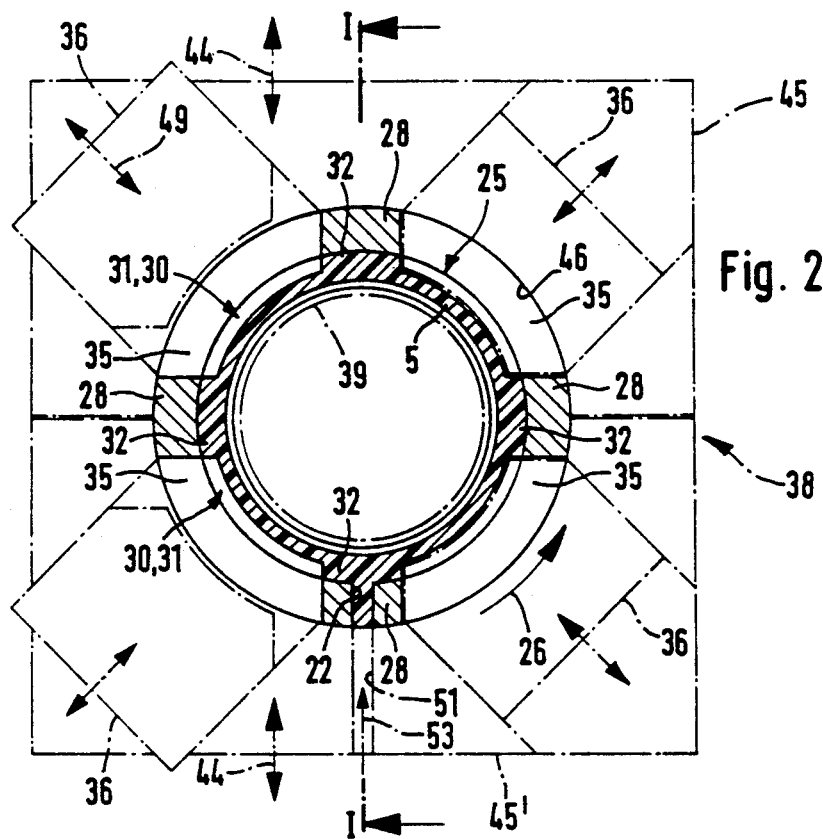
FIG. 2 shows the sealing device in accordance with FIG. 1 in a cross section taken on the line II—II without showing the valve housing and the valve spool, and injection mold as shown in broken lines being arranged adjacent to the outer periphery having mold parts which may be moved like a spool, such mold being advantageous for production.
Figure 3:
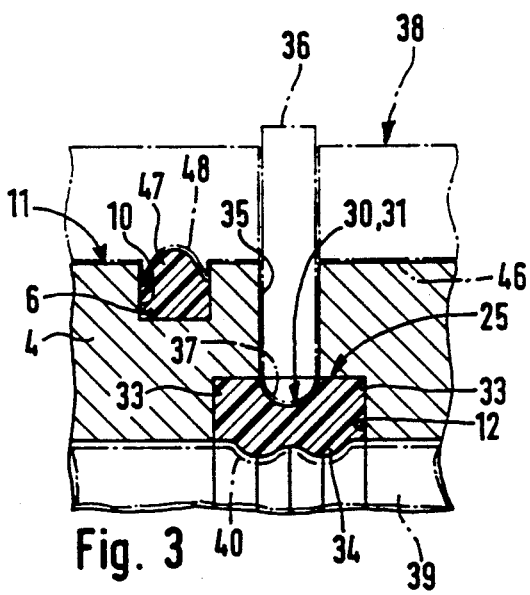
FIG. 3 shows a part on a larger scale of the holding sleeve adjacent to a pair of sealing elements, consisting of an inner and an outer sealing element, in a longitudinal section taken on the line III—III of FIG. 1 as a part of an injection mold, which is preferentially used for production, being shown in broken lines, and of a mold core being included in the figure.

After this a holding sleeve 4 prepared in this manner is arranged in the mold 38 as shown in FIGS. 2 and 3 diagrammatically, a mandril-like mold core 39 being arranged in the interior space of the holding sleeve 4 with a suitable fit. This mold core is preferably a is preferably a re-usable mold core, which is more particularly made of metal and is preferably not a drop out core. In the illustrated working embodiment of the invention an integral mold core 39 is utilized, whose outer periphery adjacent to the inner sealing elements 5 has been machined to represent the outline of the sealing parts 34 (at 40). During the molding operation a respective inner holding recess 12 on the side, which is open towards inner space of the holding sleeve 4, is consequently covered over by the correspondingly fashioned mold core section 40.

The mold halves 45 and 45' able to be moved as indicated by the arrow 44 for opening and shutting the mold constitute the injection mold 38, which receives the holding sleeve 4, the mold space 46 thereof having a configuration 48 corresponding to the outline of the sealing part 47 thereof in the parts where outer sealing elements are to be produced.

The injection mold has a plurality of preferably moving mold parts 36 corresponding to the number of recesses 35, such mold parts 36 in the illustrated working embodiment being in the form of slides able to be moved as indicated by the double arrow 49 to and fro. Prior to molding they are moved into a working position, in which they extend in the manner described above through the recesses 35 present, into the inner holding recesses 12.

The mold 38 arranged around the holding sleeve 4 has a plurality of feed ducts 51 corresponding to the number of ducts for molding material 22 and communicating with the latter in the shut condition, for the injected material which consists of sealing material. One of these feed ducts 51 is illustrated in FIG. 2 in broken lines and it extends radially internally in alignment to merge with an duct for molding material 22, while injected material is fed in radially inwards as indicated by the arrow 53. For each inner holding recess 12 there is an duct for molding material 22 which extends through one of the associated ribs of the material 28. It is naturally possible to have a plurality of ducts for molding material 22 in a plurality of ribs 28 if necessary.

Sealing material is now supplied in a flowing condition to the inner holding recesses 12 through the feed ducts 22. The inner sealing elements are therefore separately supplied from the outside. The sealing material is however able to flow on its own accord via the connection ducts 23 into the associated outer holding recess 10 so that simultaneously the outer sealing elements 6 are molded as well. The connection ducts 23 in this case have the function of an duct for molding material. The configuration of the inner sealing elements 5 is in this case predetermined by the outline of the inner holding recess 12, by the end sections 37, which project into the same, of the injection mold parts 36 and by the outline of the mold core section 40. The end sections 37 are responsible for a modification of the deformation recesses 31 as explained above.

After the conclusion of the injection molding operation the injection mold 38 is removed and the mold core 39 is pulled out axially from the finished sealing device 3. When it is extracted, the mold core 39 presses against the radially inwardly extending sealing part 34 of the inner sealing elements 5. When this happens the sealing parts are forced back radially outwards, the deformation being taken up to a considerable extent by the deformation spaces 30. It is in this manner that damage to the sealing parts is prevented, such sealing part consisting in the illustrated working embodiment of two axially following circumferential extending sealing lips for each inner sealing element. It is consequently possible to utilize mold cores 39, which at least adjacent to the mold core sections 40 have a non-interrupted outer surface, this avoiding the formation of flash. The radial resilience has a favorable effect during later use as regards resistance to wear since on movement past of the sealing edges. which delimit the guide sections 8 of the valve spool 7, yielding is possible.

The sealing device 3 practically constitutes a sealing cartridge for pneumatic valves, in the case of which the inner and more particularly the outer seals consisting of an elastic material are molded onto a supporting sleeve or a support tube.

We claim:

1. A sealing device for use in a multiway valve, comprising:
   an elongated, hollow sleeve-like holding member having a radially outwardly facing surface and a radially inwardly facing surface, said radially inwardly facing surface having a plurality of axially spaced, circumferentially extending, radially inwardly facing holding recesses each with means defining a radially inwardly facing bottom wall therein;
   a radially inwardly facing sealing element received in each radially inwardly facing recess and having, at locations whereat said sealing element contacts wall surfaces of the holding recess, a shape conforming to a shape of the wall surfaces of the holding recess, said inwardly facing sealing element having a radial part projecting radially inwardly beyond the confines of said radially inwardly facing surface; and
   means defining at least one circumferentially extending empty space between said radially inwardly facing bottom wall of each said radially inwardly facing holding recess and a radially outwardly facing part of said radially inwardly facing sealing element for allowing a radial deformation of said radial part of said sealing element into each respective said holding recess.

2. The sealing device according to claim 1, wherein said multiway valve has a valve housing with a cavity therein, wherein said hollow sleeve-like holding member is received in said cavity and has a valve spool reciprocally movably supported in the hollow interior of said holding member, and wherein an outer peripheral surface of said valve spool slidingly and sealingly engages said radially inwardly facing sealing element.

3. The sealing device according to claim 2, wherein said holding member has a plurality of axially spaced, circumferentially extending, radially outwardly facing, holding recesses each with means defining a radially outwardly facing bottom wall, and wherein a radially outwardly facing sealing element is received in each radially outwardly facing recess and having, at locations whereat said sealing element contacts wall surfaces of the holding recess, a shape conforming to a shape of the wall surfaces of the holding recess, said outwardly facing sealing element having a radial part projecting radially outwardly beyond the confines of said radially outwardly facing surface.

4. The sealing device as claimed in claim 3, wherein the radially outwardly facing sealing elements are constituted by sealing material directly injected molded into the associated recesses.

5. The sealing device as claimed in claim 4, wherein at least one radially inwardly facing holding recess and at least one radially outwardly facing holding recess are in communication with each other via at least one connection duct in the holding member.

6. The sealing device as claimed in claim 5, wherein the radially inwardly and radially outwardly facing holding recesses, which are in communication with each other, are arranged with an axial offset in relation to each other.

7. The sealing device as claimed in claim 5, wherein the radially inwardly and outwardly facing sealing elements arranged in mutually communicating holding recesses are connected with each other integrally via sealing material filling the connection ducts.

8. The sealing device as claimed in claim 5, wherein at least one connection duct is constituted by a duct for molding material which during molding of the sealing elements renders possible the transfer of still flowable sealing material from one holding recess to another one.

9. The sealing device as claimed in claim 5, wherein at least one connection duct is constituted by a duct for molding material which during molding of the sealing elements renders possible the transfer of still flowable sealing material from one of the radially inwardly facing holding recesses to one of the radially outwardly facing holding recesses.

10. The sealing device as claimed in claim 1, wherein each radially inwardly facing holding recess communicates with at least one passage for molding material leading to the outwardly facing surface of the holding member.

11. The sealing device as claimed in claim 1, wherein the holding member is designed in the form of an integral one-piece holding member.

12. The sealing device according to claim 1, wherein each empty space comprises a deformation recess which is molded in the radially outwardly facing face of the molded radially inwardly facing sealing element.

13. The sealing device according to claim 12, wherein each empty space comprises a recess in the holding member, said recess in the holding member radially adjoining the radially outwardly facing face of the radially inwardly facing sealing element and is in radial alignment with the deformation recess in the radially inwardly facing sealing element.

14. The sealing device according to claim 13, wherein said recess in the holding sleeve extends radially in the holding member.

15. The sealing device according to claim 14, wherein said recess in the holding member is in the form of a slot.

16. The sealing device according to claim 1, wherein each empty space comprises a recess in the holding member, said recess in the holding member radially adjoining the radially outwardly facing face of the radially inwardly facing sealing element.

17. The sealing device according to claim 16, wherein said recess in the holding sleeve extends radially in the holding member.

18. The sealing device according to claim 17, wherein said recess in the holding member is in the form of a slot.

19. The sealing device according to claim 1, wherein a plurality of circumferentially extending empty spaces are provided along the radially outwardly facing face of the radially inwardly facing sealing element.

20. The sealing device according to claim 19, wherein circumferentially adjacent empty spaces are separated from each other by at least one of a radially outwardly extending rib on the radially inwardly facing sealing element and a rib on the holding member.

21. The sealing device according to claim 20, wherein the circumferential extent of each of the empty spaces are equal to one another.

* * * * *